(12) United States Patent
Hecht

(10) Patent No.: US 10,037,561 B1
(45) Date of Patent: Jul. 31, 2018

(54) SYSTEMS AND METHODS FOR MANAGING LISTS USING AN INFORMATION STORAGE AND COMMUNICATION SYSTEM

(71) Applicant: Wells Fargo Bank, N.A., San Francisco, CA (US)

(72) Inventor: Al Hecht, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 427 days.

(21) Appl. No.: 14/195,341

(22) Filed: Mar. 3, 2014

Related U.S. Application Data

(60) Provisional application No. 61/806,686, filed on Mar. 29, 2013, provisional application No. 61/922,492, filed on Dec. 31, 2013.

(51) Int. Cl.
*G06Q 30/00* (2012.01)
*G06Q 30/06* (2012.01)
*G06Q 20/36* (2012.01)

(52) U.S. Cl.
CPC ......... *G06Q 30/0633* (2013.01); *G06Q 20/36* (2013.01)

(58) Field of Classification Search
CPC ........... G06Q 20/36; G06Q 30/0601–30/0645; G06Q 30/08; G06Q 30/0633
USPC ...................... 705/26.1–27.2, 26.8
See application file for complete search history.

(56) References Cited

U.S. PATENT DOCUMENTS

| | | | |
|---|---|---|---|
| 6,587,835 B1 * | 7/2003 | Treyz | G06Q 20/12 705/14.64 |
| 6,898,598 B2 | 5/2005 | Himmel et al. | |
| 6,912,507 B1 * | 6/2005 | Phillips | G06Q 10/06311 705/22 |
| 6,934,686 B1 | 8/2005 | Rajagopalan | |
| 7,162,451 B2 | 1/2007 | Berger et al. | |
| 7,778,934 B2 | 8/2010 | Graves et al. | |
| 8,260,806 B2 | 9/2012 | Steele et al. | |

(Continued)

OTHER PUBLICATIONS

Corcoran, Cate T., "Caught in a Cloud: Technology Revolution Reinventing Retail" WWD: Women's Wear Daily; Los Angeles vol. 199, Iss. 13 (Jan. 20, 2010): 1. (Year: 2010).*

(Continued)

*Primary Examiner* — Michael Misiaszek
*Assistant Examiner* — Katherine L O'Sullivan
(74) *Attorney, Agent, or Firm* — Foley & Lardner LLP

(57) ABSTRACT

A system includes a processor and an information wallet application stored on machine readable storage media coupled to the processor and including program logic that causes the processor to receive a shopping list from a first information wallet adapter stored on a user computing device, send the shopping list to a second information wallet adapter stored on a merchant computing device, receive merchant data from the second information wallet adapter, wherein the merchant data includes one of price data and quantity data for at least one item included in the shopping list, and send the merchant data to the first information wallet adapter. The system also includes a cloud storage computing system accessible by the information wallet storage application and configured to communicate with the first and second information wallet adapters in order to store and retrieve shopping list data associated with the shopping list.

21 Claims, 8 Drawing Sheets

(56) References Cited

U.S. PATENT DOCUMENTS

| | | |
|---|---|---|
| 8,612,349 B1 | 12/2013 | Ledder et al. |
| 8,825,757 B2 | 9/2014 | Lunt et al. |
| 2002/0179704 A1* | 12/2002 | Deaton .............. G06Q 20/04 235/383 |
| 2003/0028427 A1 | 2/2003 | Dutta et al. |
| 2005/0097320 A1 | 5/2005 | Golan et al. |
| 2007/0162338 A1 | 7/2007 | Lawe |
| 2008/0010298 A1* | 1/2008 | Steele .............. G06Q 30/06 |
| 2009/0132392 A1 | 5/2009 | Davis et al. |
| 2009/0132415 A1 | 5/2009 | Davis et al. |
| 2010/0250364 A1 | 9/2010 | Song et al. |
| 2011/0004921 A1 | 1/2011 | Homer et al. |
| 2011/0106698 A1 | 5/2011 | Isaacson et al. |
| 2012/0022944 A1* | 1/2012 | Volpi .............. G06Q 30/00 705/14.53 |
| 2012/0066262 A1 | 3/2012 | Greenberg |
| 2012/0150643 A1 | 6/2012 | Wolfe et al. |
| 2012/0150731 A1 | 6/2012 | Isaacson et al. |
| 2012/0150743 A1 | 6/2012 | Isaacson et al. |
| 2013/0024327 A1 | 1/2013 | Nargizian |
| 2013/0073365 A1 | 3/2013 | McCarthy |
| 2013/0332342 A1 | 12/2013 | Kasower |
| 2014/0214626 A1 | 7/2014 | Bowers et al. |
| 2014/0244487 A1 | 8/2014 | Seligmann et al. |
| 2015/0052064 A1 | 2/2015 | Karpenko et al. |
| 2015/0220924 A1 | 8/2015 | Bakker |
| 2015/0248664 A1 | 9/2015 | Makhdumi et al. |
| 2015/0339652 A1 | 11/2015 | Park et al. |
| 2016/0239887 A1 | 8/2016 | Zhao et al. |

OTHER PUBLICATIONS

Non-Final Office Action on U.S. Appl. No. 14/195,182 dated Mar. 28, 2016, 13 pages.

Non-Final Office Action for U.S. Appl. No. 14/195,145 dated Oct. 11, 2016. 12 pages.

Non-Final Office Action for U.S. Appl. No. 14/195,297, dated Jul. 12, 2016. 18 pages.

Non-Final Office Action for U.S. Appl. No. 14/195,161 dated Oct. 31, 2016. 16 pages.

\* cited by examiner

SYSTEMS AND METHODS FOR MANAGING LISTS USING AN INFORMATION STORAGE AND COMMUNICATION SYSTEM

CROSS-REFERENCE TO RELATED PATENT APPLICATIONS

This application claims priority to U.S. Provisional Patent Application No. 61/806,686, entitled "SYSTEMS AND METHODS FOR INFORMATION STORAGE AND COMMUNICATION," filed on Mar. 29, 2013, by Al Hecht, and to U.S. Provisional Patent Application No. 61/922,492, entitled "SYSTEMS AND METHODS FOR MANAGING LISTS USING AN INFORMATION STORAGE AND COMMUNICATION SYSTEM," filed on Dec. 31, 2013, by Al Hecht, both of which are incorporated by reference in their entireties and for all purposes.

BACKGROUND

Individuals are often asked to compile information in connection with receiving various goods or services. For example, an individual may often need to generate a shopping list for goods and/or services. Oftentimes, the information that the individual needs to compile for the shopping list is the same or similar to information that the individual has previously compiled but is no longer readily available, such as a misplaced or discarded handwritten list. In other instances, data for the shopping list must be gathered and organized from multiple sources, and certain items may be omitted in the process. In some instances, the individual may need to conduct research regarding the goods or services regarding, for example, the best available pricing, which may involve a significant amount of time. In other instances, the individual may proceed to a merchant location only to discover that one or more goods or services are not available or are difficult to locate. In still other instances, the individual may return with purchased goods and services only to discover that he or she was unaware of an applicable merchant offer related to the purchased goods and services. In yet other instances, the individual may lose track of goods and services that were purchased and accidentally procure unnecessary additional quantities. Enhanced systems and methods of managing lists such as shopping lists would be desirable.

SUMMARY

According to an exemplary embodiment, an information wallet computing system includes a processor and an information wallet application stored on machine readable storage media coupled to the processor and including program logic that, when executed by the processor, causes the processor to receive a shopping list from a first information wallet adapter stored on a user computing device, send the shopping list to a second information wallet adapter stored on a merchant computing device, receive merchant data from the second information wallet adapter, wherein the merchant data includes one of price data and quantity data for at least one item included in the shopping list, and send the merchant data to the first information wallet adapter. The information wallet computing system also includes a cloud storage computing system accessible by the information wallet storage application and having a storage adapter configured to communicate with the first and second information wallet adapters in order to store and retrieve shopping list data associated with the shopping list.

According to another exemplary embodiment, a method of using an information wallet system to manage a shopping list includes receiving shopping list data at a user computing device. The shopping list data includes items to be added to the shopping list. The method also includes generating the shopping list at the user computing device. The shopping list includes one or more of the items included in the shopping list data. The method also includes sending the shopping list to a merchant computing device via the information wallet system and receiving merchant data at the user computing device from the merchant computing device via the information wallet system. The merchant data includes one of price data and quantity data for at least one item included in the shopping list. The method also includes receiving a list of items purchased at the user computing device from the merchant computing device via the information wallet system and reconciling the list of items purchased with the shopping list at the user computing device to generate an updated shopping list.

According to another exemplary embodiment, a method of using an information wallet system to manage a shopping list includes receiving a shopping list from a user computing device at a merchant computing device via the information wallet system and sending merchant data to the user computing device. The merchant data includes one of price data and quantity data for at least one item included in the shopping list. The method further includes guiding a user of the user computing device to the location of the at least one item included in the shopping list via location data sent to the user computing device.

DETAILED DESCRIPTION

The systems and methods, described in greater detail below, provide an information wallet system configured to receive information from a user and enable the user to communicate the information in a highly secure, convenient, efficient, time-saving, and cost-effective manner. As described below with respect to FIGS. 1-5, the systems and methods may allow merchants and other businesses to reduce their reliance on technologies such as card swipe, card readers, cash machines, custom kiosks, cash registers, specialized scanners, etc. The information may be stored in the cloud and/or locally on the customer's device. In some arrangements, the information may be stored at an external storage system associated with another entity. A token may link data stored at the external storage system to the information wallet such that the information may be accessed by the information wallet system. The information may also be stored in a financial institution computing system and maintained by the financial institution. The information may be accessible to the individual and other entities, with the approval of the user, using a mobile device (i.e. laptop, mobile phone, tablet, portable gaming device, and portable electronic device) or other computing devices (i.e. desktop computer).

Figure 1:
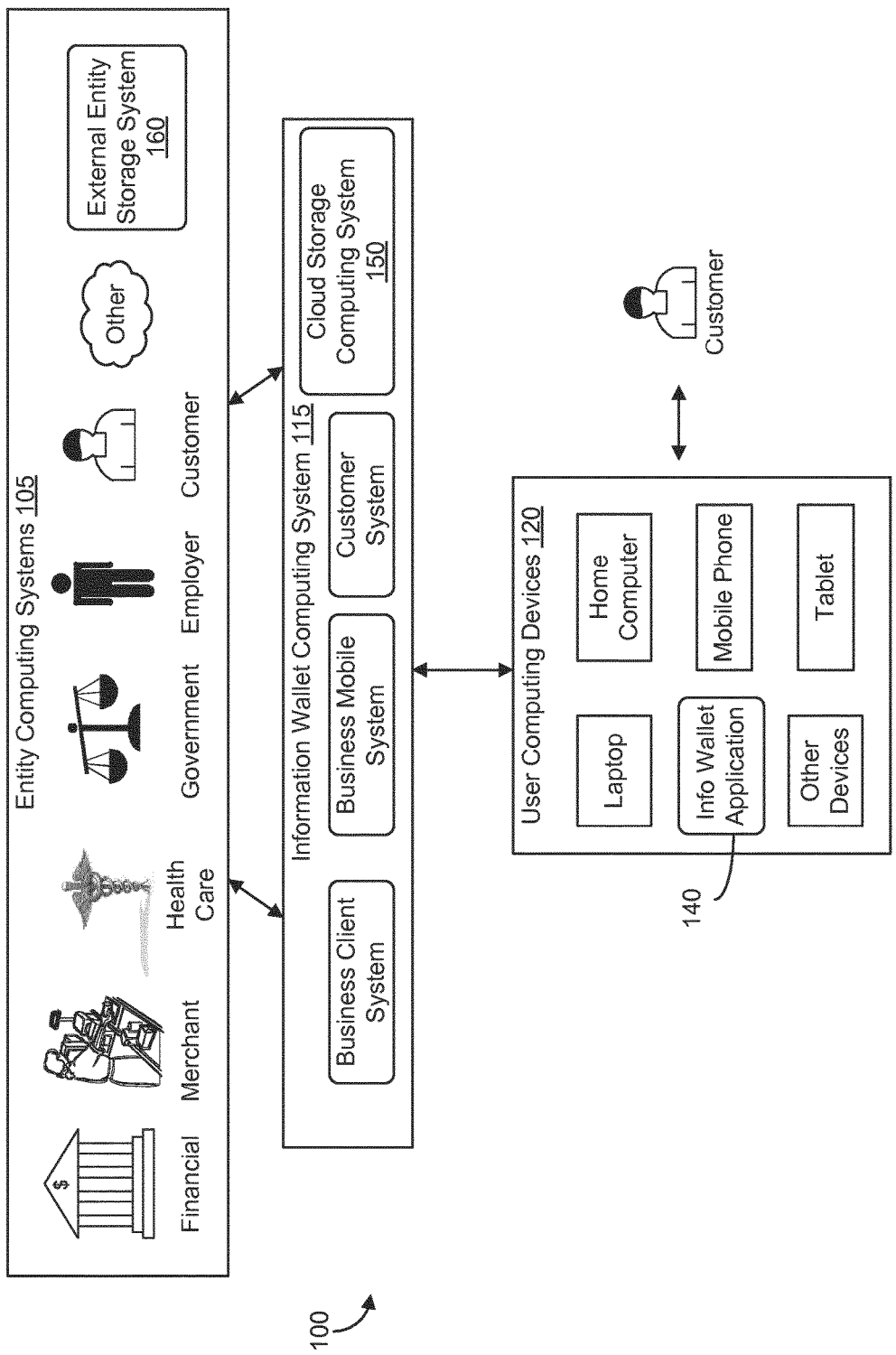
FIG. 1 is a schematic diagram of a computer-implemented information wallet system according to an example embodiment.
Figure 2:
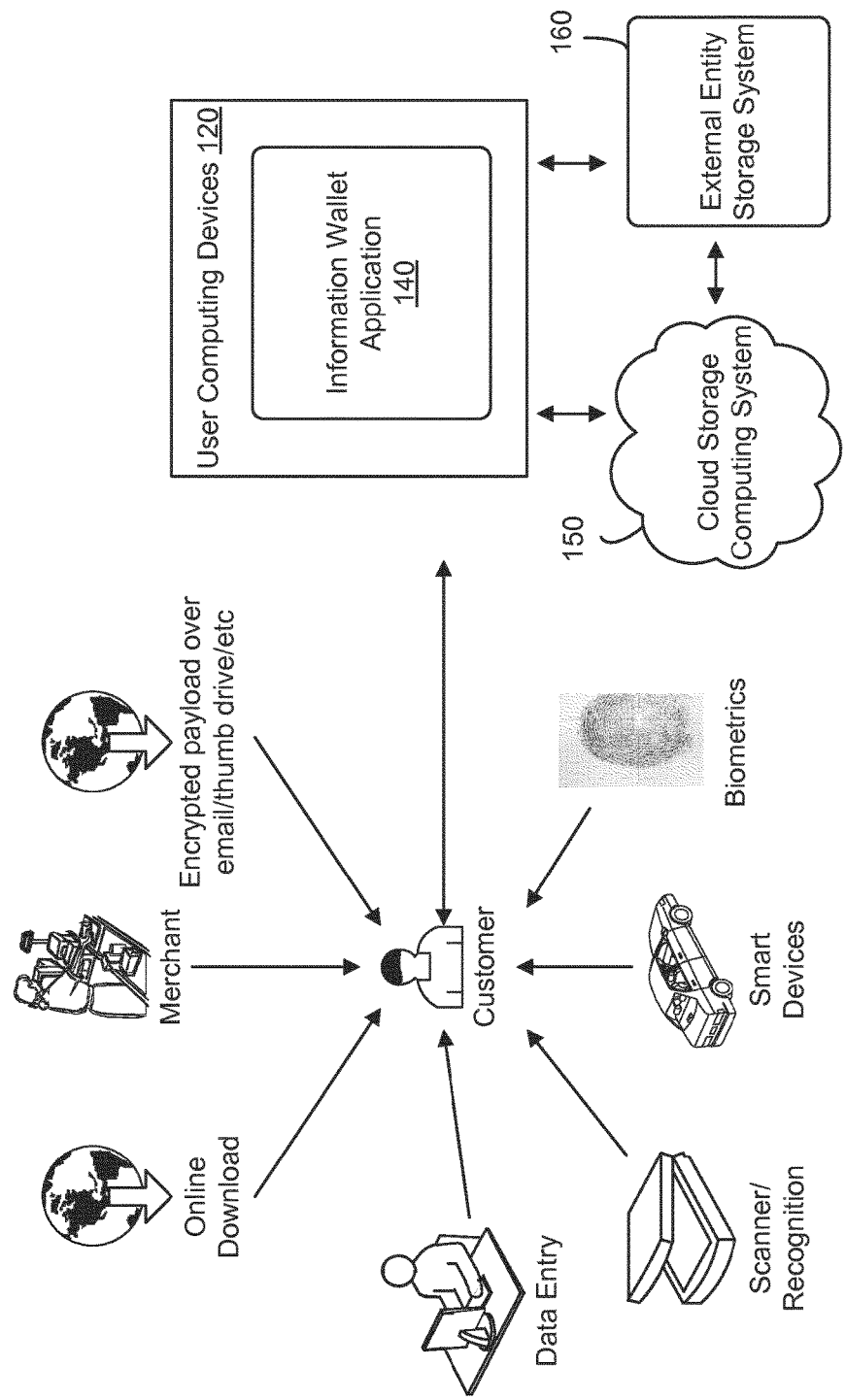
FIG. 2 is a schematic diagram of a computer-implemented information receiving system of the information wallet system in FIG. 1 according to an example embodiment.
Figure 3:
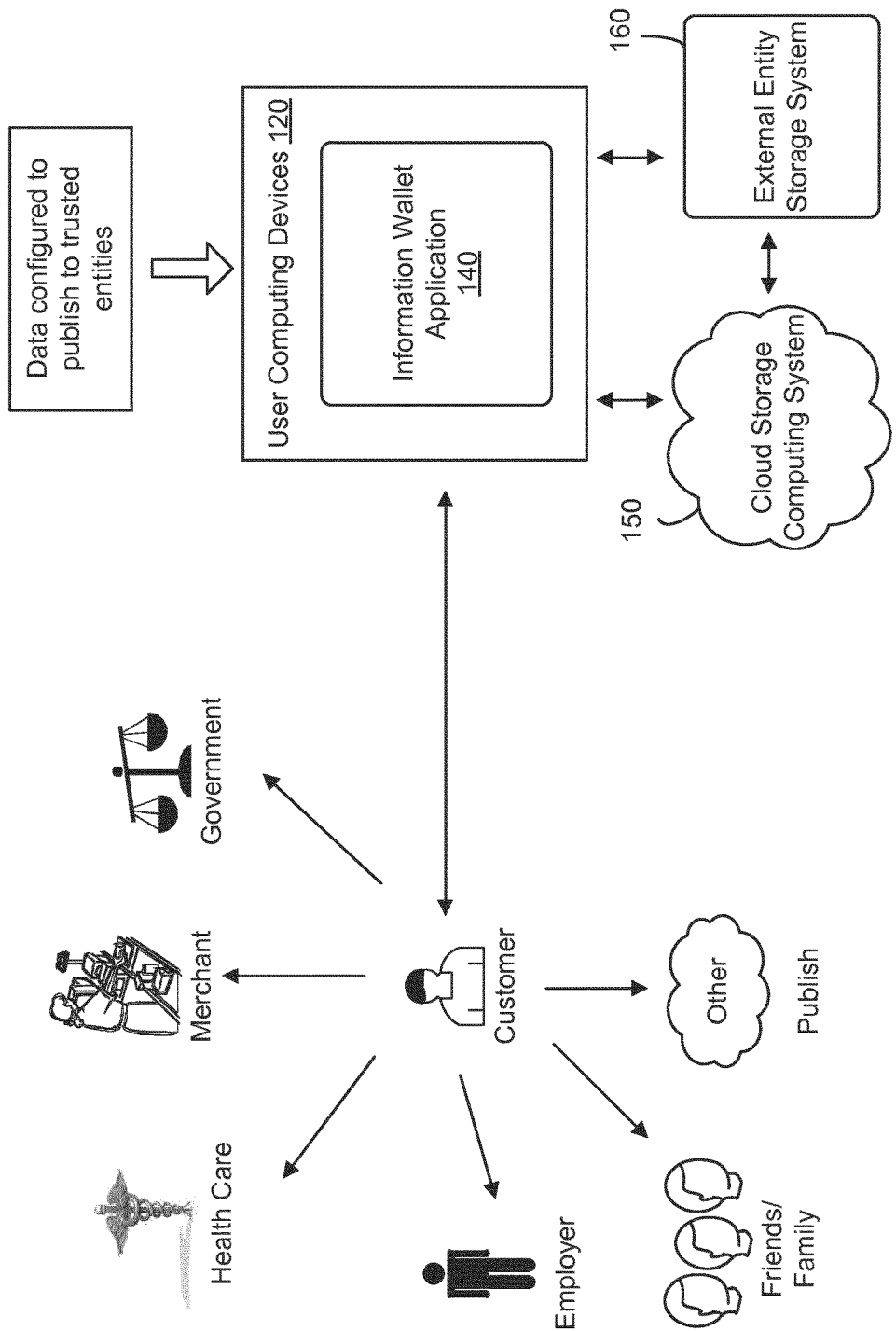
FIG. 3 is a schematic diagram of a computer-implemented information sharing system of the information wallet system of FIG. 1 according to an example embodiment.
Figure 5:
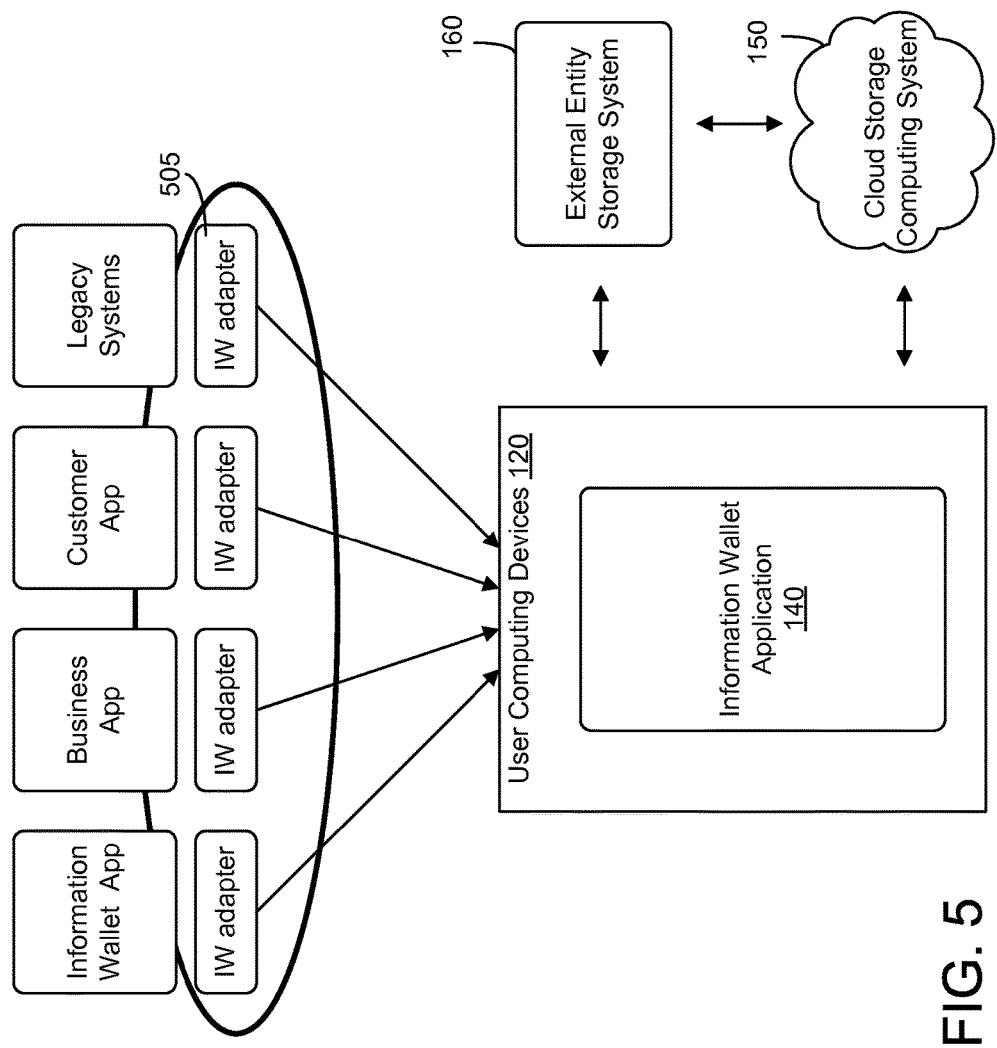
FIG. 5 is a diagram showing information synchronization between various adapters and user applications according to an example embodiment.

Referring to FIG. 1, a computer-implemented information wallet system 100 is shown that may be used by a customer (also referred throughout as a user) to set up and utilize an information wallet account using a user computing device 120 (i.e. laptop, mobile phone, tablet, or home computer). In the various embodiments, data storage and other functionality for the information wallet system 100 may include a cloud-based storage computing system 150 and/or other functionality provided by the information wallet computing system 115. The information wallet computing system 115, in one example embodiment, may be provided a financial institution computing system (e.g., a bank computing system). The user may be an individual consumer that may have one or more accounts with the financial institution and has also established an information wallet account with the financial institution. In another embodiment, the user may not have a financial account with the financial institution but may nevertheless have established an information wallet account with the financial institution. The information wallet system 100 is configured to meet the varied needs of users in the embodiments above and embodiments discussed below. In other embodiments, the information wallet system 100 may be provided by other entity computing systems 105. Other entity computing systems may comprise a second financial institution, a merchant, a health care organization, a government organization, an employer, a customer, or other entity with a computing system. The other entity computing systems 105 may store data that is accessed by the information wallet system 100 (e.g., in external entity storage systems 160 as shown in FIGS. 2, 3, and 5). The information wallet system 100 may include a link out to the data stored in the other entity computing systems 105 such that the data stored by the other entity computing systems 105 is seamlessly accessed by the information wallet computing systems 115. The information wallet computing system 115 may be used to facilitate storing information and communicating stored information to one or more entities, potentially via a user computing device 120.

The financial institution may include a financial institution computing system. The computing system may include various storage, such as banking servers, configured to store data relating to a plurality of customer accounts, financial records, and other documents. The stored data may be backed up in multiple data centers, for example, data centers that are geographically diverse. The computing system may include account management logic (e.g., programming modules stored in a memory and configured to be executed by a processor, such as the processor of the banking server). The account management logic may be part of the banking servers or may reside on a separate server within the computing system. The account management logic perform any typical functions and transactions associated with managing and maintaining a bank account for a customer, including, but not limited to opening new accounts, closing existing accounts, crediting accounts, debiting accounts, transferring funds between accounts, processing debit and credit card transactions, calculating and applying interest, calculating balances, performing account transfers, processing electronic bill payment transactions, and the like. The account management logic may include transaction processing logic to perform the above recited tasks. The account management logic may be configured to manage a plurality of types of accounts, including but not limited to demand deposit accounts (e.g., checking accounts, savings accounts, etc.), credit card accounts, lines of credit, and the like. The financial institution computing system may include interface logic configured to connect the financial institution computing system to computing systems associated with the plurality of users by way of a communication network. The financial institution computing system may include import logic configured to import financial statements regarding the financial accounts on a scheduled basis and/or to import user-provided documents on a user-determined timing basis.

Referring to FIG. 1, information wallet system 100 may include, among other systems, entity computing systems 105 (i.e. a merchant computing system and/or a financial institution computing system), an information wallet computing systems 115, a user computing device 120 (which may include a laptop, home computer, mobile phone, tablet, or any other computing devices), and cloud storage computing systems 150. The computing systems and devices 105, 115, 120, and 150 may communicate through a cloud network, which may include one or more of the Internet, cellular network, near field communication (NFC), Bluetooth connection, Wi-Fi, Wi-Max, a proprietary banking network, etc. The entity computing systems 105, information wallet computing systems 115, user computing devices 120, and cloud storage computing systems 150 may each comprise a computer system (e.g., comprising one or more processors) configured to execute instructions, send and receive data stored in non-transitory memory, and perform other operations to implement the operations and functions described herein associated with logic or processes as shown in the figures and discussed throughout the disclosure.

The entity computing systems 105 are implemented by entities that interact to exchange information with users. Such entities, as described above, could include a financial institution, a merchant of goods or services, a health care organization, a government organization, an employer, a customer, or any other entity or combination of entities. The entity computing system 105 may, for example, be provided by any entity that provides goods or services to consumers. The entities may enter into transactions with the user and/or may exchange information with the user. For example, the entity computing systems 105 may implement an Internet destination (e.g., website) where users may obtain user names/login IDs or otherwise become registered members. Registration of the users as members could allow a user and entity to connect quickly and securely, determine and share a variety of relevant information, and optimize the shared information to get meet both the user and entity needs. As another example, the entity computing systems 105 may be provided at a bricks and mortar location where the user receives goods or services, such as a store, a hospital, a restaurant, a hotel, etc. The information exchanged may, for example, relate to the goods or services received by the user at the location.

The user computing devices 120 may be used by a user to create an information wallet account and interact with an entity computing system 105. The user computing devices 120 may include mobile devices such as a smart phone, portable gaming device, portable music listening device, portable digital or electronic viewing device, or another suitable wireless device. A user computing device 120 may comprise network interface logic, a display device, an input device, and an information wallet application 140. Network interface logic may include, for example, program logic that connects the user computing device 120 to the network. As described in greater detail below, for example, the user computing device 120 may display screens to prompt the user to review and/or approve data transfer requests, to request data from the user, etc. Such screens may also be used to prompt the user to specify parameters regarding the level of security to be associated with different elements of data regarding the user. For example, data requests including a mailing or physical address may be assigned a higher level of security than data requests involving an email address. Such screens are presented to the user via the display device. The display device may be interactive, for example touch-screen. An input device may be used to permit the user to initiate access to the information wallet and to facilitate sending/receiving requested information to/from the entities. In one embodiment, the input device may allow a user to manage lists and orders stored in the information wallet system 100.

FIG. 1 shows information wallet computing system 115 disposed between the entity computing systems 105 and the user computing devices 120. In one embodiment, the information wallet computing system 115 resides within a financial institution computing system. The information wallet computing system 115 may comprise program logic executable by and between the entity computing systems 105 and the user computing devices 120 to implement at least some of the functions described herein. As will be appreciated, the level of functionality that resides on the entity computing systems 105 or information wallet computing system 115 as opposed to the user computing devices 120 may vary depending on the implementation. The information wallet computing system 115 may include modules such as a business client system, business mobile system, and customer system. The business client system module may provide the backend support of the information wallet application disposed on a business client side. Likewise, the business mobile system and customer system modules may provide backend support of the information wallet application disposed on a business mobile device or a customer device. The information wallet computing system 115 may also host the cloud storage computing system 150.

The information wallet computing system 115 may allow the user computing devices 120 to interact with entity computing systems 105. In one embodiment, the information wallet computing system 115 facilitates the exchange of information between the user computing device 120 and the entity computing device 105. For example, the information wallet computing system 115 may receive information from a user computing device 120 and transfer that information to the entity computing system 105. In one embodiment, the information received from the user computing device 120 corresponds with a request to the information wallet computing system 115 to retrieve certain information. The information wallet computing system 115 may receive the request, access the cloud storage computing system 150, retrieve the requested information, and forward the information as requested to the entity computing system 105. In another embodiment, the same process may apply for transferring information from an entity computing system 105 to the user. The information wallet computing system 115 may receive information from an entity computing system 105 and transfer that information to a user computing device 120. The information received may correspond with a request to the information wallet computing system 115 to retrieve certain information from the cloud storage computing system 150. There, the information wallet computing system 115 may receive the information including the request from the entity computing system 105, access the cloud storage computing system 150, retrieve the requested information, and transfer the information to the user computing device 120. For embodiments described throughout the disclosure, any user, customer, or entity may create an information wallet account through the information wallet system 100 using an available computing device.

The cloud storage computing system 150 may store information that is provided by the user, e.g., after the information wallet is enriched by one or more of the processes shown in FIG. 2, described below. The cloud storage computing system 150 may encrypt the data regarding the user. In some embodiments, the cloud storage computing system 150 may permit an entity to access the data based on a permission or security level granted by a user. For example, if a user configures an information wallet account to allow broad permission for sharing information about vehicles owned by the user, then an entity seeking the color of the user's vehicle may obtain that information without waiting for further approval. The entity may solicit the information from the cloud storage computing system 150 through the information wallet computing system 115, and the information wallet computing system 115 may retrieve the information based on pre-set permission by the user. The cloud storage computing system 150 is designed to give the user full control of the information stored by the user in the cloud storage computing system 150. The system is configured such that an outside computing system may only access information in conformance with permission and security levels set by a user.

Some of the user information may be stored in the external entity storage systems 160 of entities 105. Accordingly, some data may be stored outside of the cloud storage computing system 150 and the user computing devices 120. In these situations, the information wallet computing system 115 may include a link out to the data stored in the external entity storage systems 160. The link out may be a token that is stored in the cloud storage computing system 150 or in the information wallet application 140 running on the user computing devices 120. The link out indicates to the information wallet system 100 the location and content of the information stored the external entity storage systems 160 of entities 105 such that the data can be integrated into the user's information wallet without having to store the data in the information wallet computing system 115. For example, a user may opt not to store medical information (e.g., an MRI, X-rays, etc.) in the information wallet computing system 115, but rather in a records database of the user's medical provider. In this situation, the information wallet computing system 115 may be configured with a link out to the medical information stored in the records database of the medical provider such that that the information wallet system 100 has access to the externally stored data.

In an example embodiment, the information wallet system 100 allows interoperability between various entity computing systems 105 (e.g., external entity storage systems 160), information wallet computing systems 115, user computing devices 120, and other relevant systems. In order to provide the interoperability with each of the above listed systems, various adapters may be utilized on a plurality of systems. Adapters facilitate integrating computing systems of different technological platforms in a manner that allows different computing systems to connect with the information wallet system 100. The adapters may be implemented, for example, using plug-ins or Application Program Interfaces ("APIs"), which comprise a set of software components that add specific abilities to a larger software application. The plug-ins or APIs, in one embodiment, add the ability of one technological hardware or software to connect with the information wallet system 100. The plug-ins or APIs may also enable the functionality of an application to be customized, such as an enterprise application that supports business operations of a business entity or an application (e.g., browser) executed on a user computing device 120. The application may be customized to meet any need or requirement of any particular entity, business, or customer using the information wallet system 100. For example, a hotel may have enterprise software with a plug-in installed that displays a button screen (i.e. "Request via Info Wallet") in the check-in screen. Upon the engaging the button, such as by pressing the button, the enterprise software may execute the plug-in. The plug-in may, for example, initiate the generation of a Bluetooth signal to establish Bluetooth contact with a user computing device 120. A random PIN may be verbally or textually communicated to the user for entry into the user computing device 120 in order to initiate Bluetooth pairing with the user computing device 120 of the user. The plug-in may therefore, via Bluetooth, request information from the information wallet system 100 of the user that is checking into the hotel. In other scenarios, the connection may be made by way of another type of wireless connection, such as but not limited to, Wi-Fi, WAN, 3G, 4G, NFC, etc. The plug-ins or APIs may use a request/response protocol to communicate messages and execute code. The plug-ins may send messages in a predetermined format that contain a list of data that is requested. The user computing device 120 may receive the Bluetooth request and generate a screen requesting permission to send the requested information. The adapters may also request certain packages of data. For example, if a common adapter is developed that is used by various hotels using the same enterprise software, then all hotels may ask for the same package of data, and that information may be standardized and prepackaged to be sent each hotel. As will be appreciated, similar arrangements may be implemented in other contexts (e.g., healthcare providers, merchants, etc).

The cloud storage computing system 150 may cooperate with the information wallet computing system 115 on the user computing device 120 to provide different levels of security to the information stored in the cloud storage computing system 115. For example, the user may configure the information wallet to provide the address and phone number of the user with a first (relatively low) level of security, to provide a credit card number of the user with a second (higher) level of security, to provide the credit card cvv value with a third (still higher) level of security, and to provide the user's social security with a fourth (even higher) level of security. As will be appreciated, any number of different levels of security may be provided. The level of security given to any particular data element may be determined as a matter of default (e.g., information wallet configuration may by default dictate that the user's social security number is given a higher level of security than the user's phone number), based on user-specified inputs (e.g., the user may be given the ability to set security on a data element by data element basis, to set security for groups of related data (e.g. health data vs. financial data), and/or to set security in another manner), etc. The level of security assigned to a specific type of information or data may alter the steps that must be taken in order for the information wallet system to relinquish the information to an outside computing system. For example, information and data with a relatively low level of security may be pre-approved for sharing by the user, and the information wallet computing system 115 may relinquish the information upon request by the entity. On the other hand, information or data assigned a higher level of security may require the information wallet computing system 115 to contact the user through the user computing device 120 and solicit authorization from the user. The authorization may be supplied by a number of ways, including, for example, an electronic signature, a pin number, a finger print, or direct user authorization through the user computing device 120. Security and/or validity of an information request is not exclusively "fixed." The informational wallet will have the capability to determine whether the "context of the transaction" is valid. Accordingly, if certain known patterns of fraud or trolling for information are detected the user may be alerted to the potential fraud or troll for data. Analytical models may be used to determine the probability of a valid or invalid data request.

As will also be appreciated, the security precautions taken in the context of a particular transaction may be determined not only based on the level of security associated with a particular information or data element, but also based on other factors, such as the identity of the entity requesting the information. For example, the user may configure the information wallet such that the user's spouse is granted access to all of the user's data, regardless of the level of security with which the data is associated. As another example, the information wallet may be configured such that the user's health care providers are given easier access to the user's health-related data, and the user's accountant is given easier access to the user's financial data. Hence, the user's approval may be prompted prior to the user's financial data being provided to the user's health care provider, but not prior to the user's financial data being provided to the user's accountant. Conversely, the user's approval may be prompted prior to the user's health-related data being provided to the user's accountant, but not prior to the user's health-related data being provided to the user's health care provider. As will be appreciated, the level of security provided may also be dependent on other factors, such as the time of day that the data is being requested (e.g., a request for data occurring in the middle of the night might be considered to be more likely to be fraudulent in some circumstances), the location of the requester (e.g., the IP address of the requester may indicate that the requester is overseas), the location of the user (e.g., the GPS signals from the user computing device 120 may indicate that the user is at a location that would not normally be associated with a request for health-related information), etc. As will be appreciated, heightened levels of security provided may also be provided in certain circumstances as a result of the operation of other fraud prevention algorithms (e.g., a pattern of requests for financial information may be identified as being unusual and therefore potentially fraudulent).

As discussed above, the action required to be taken by the user in order to approve such an information exchange may also be varied depending on the circumstances. For example, in some instances, approval may be passively granted based on the settings the user has set for their data (e.g., no affirmative action is required by the user to give the user's spouse access to the user's data). In other instances, affirmative action may be required to be taken on the part of the user. Again, the type of action may vary depending on the situation and the level of security to be provided. For example, in some instances, the approval may require the user to simply press a button labeled "approve" on the user computing device 120. In other instances, the approval may require the user entering a pin number or other secret password or code on the user computing device 120. As another example, biometric authentication, such as a body print, may be required. As will be appreciated, any number of different actions and different types of transactions may be required of a user in order to provide different levels of security in the context of particular information exchange transactions.

As will also be appreciated, in various embodiments, the information wallet system 100 may provide greater security than physical paper forms because the information is fully encrypted when exchanged and people do not have direct visual access to confidential data. The adapters on the entity computing systems 105 provide an additional layer of protection by enforcing security settings of the information wallet computing system 115. In various embodiments, the information wallet system 100 may also provide enhanced security by providing an easier alternative to manually managing large amounts of password and authentication data. A user who is required to have a plurality of usernames and passwords for different accounts may feel compelled to catalog the plurality of passwords and associated websites on a hard copy for easy access. For example, a user may write down a list of passwords and keep the passwords within reach for easy reference, thereby impairing the security of the sensitive information. In one embodiment, after using the information wallet for over a period of time, the user may no longer have to remember a plurality of passwords for a plurality of websites or entities, etc. The user may self-authenticate using a combination of the identity of the device, biometric information acquired from the user by the user computing device 120, a single unified pin/password, or other identification methods.

In some embodiments, digital signatures may be used to certify the entity, the customer, the user, or the data. For example, driver's licenses typically contain information such as the date of birth, name, address, eye color, height, weight, donor status, etc., of the holder of the driver's license. Assuming data for the driver's license is obtained from an official government department, such as the department of motor vehicles for the state issuing the driver's license, the driver's license data may be digitally signed by the department of motor vehicles using standard certification technology. Hence, when this data is communicated to another entity computing system 105, the digital signature may be communicated with the data to certify that the data is accurate. Additionally, biometric information received from governmental authorities may be used to certify an entity, the customer, the user, or the data. For example, people are often required to submit to a background check for certain employment, which often requires going to a police station to obtain a set of fingerprints. The data collected at the police station may be used for certification and self-authentication purposes.

FIG. 2 is a diagram showing various ways in which the information wallet account (through an information wallet application 140) may be enriched with data. For example, data may be entered manually by the user via a keyboard or other suitable device. The user may enter information including a name, address, phone number, contacts, calendar, and other information. Also, image data may be received via a scanner, wherein scanned information may include, for example, a birth certificate, license, diploma, etc. Data may be received from smart devices such as cars, alarm clock, medical device, appliances, watches, phones, tablets, etc. and any application running on these devices. Biometric information may also be received, such as voiceprint, fingerprint, palm print, facial recognition information, etc. In some embodiments, the biometric information may be digitally signed either by a government agency, the entity that provides the cloud storage computing system 150 (e.g., a bank), or other trusted authority. In such embodiments, the information may then be used for biometric authentication. The data received from the smart devices may be stored. The data may be stored in a database. The data may be stored in standard predefined fields of the database or may be stored in customized fields as defined by the storing entity (e.g., in fields created by augmenting standard predefined fields). The data stored may be augmented with additional data or deleted. Stored data may be include metadata such as a time stamp or a version number. Data may be permanently stored unless a delete command is received from the user.

Data may be additionally received as an encrypted payload over email, USB drive, wired or wireless Internet, and so on. The encryption allows the information to be transferred safely without being accessed from an unauthorized party. The information wallet account may also receive information from the context of a transaction with a merchant or entity. This may include purchase transaction information of any type, such as a description, quantity, or price of an item, receipt information, etc. The information wallet application 140 may download data from online sources, such as online account information, telephone information, invoices, etc. The data from these and other sources may be used to enrich the information wallet and later made accessible to the entity computing systems 105 via the user computing devices 120.

FIG. 3 is a schematic diagram showing how the data collected in FIG. 2 can be published to various entities. As shown in FIG. 3, a user may share information with government entities, merchants, healthcare providers, employer, friends/family, and others. This information may be shared according to permissive authorizations and security levels discussed above. FIG. 3 depicts the passive delivery of data wherein the user has configured data to publish to entities automatically, so that the user does not need to remember to publish the data. For example, if the user has a change of address, the updated address may be automatically transmitted to friends/family, employers, health care providers, merchants, the government, financial institutions, and so on. While FIG. 3 shows automatic sending of data (publishing), as will be appreciated, the information wallet system 100 may also be used for automatically receiving data (subscribing). For example, the user may subscribe to automatically receive data or messages regarding specific content from a specific entity computing systems 105. While some information may be configured to publish and subscribe automatically, other information may be configured to block automatically. For instance, the system may be configured to prevent publishing information to specific entities (i.e. credit card companies) or to block automatic subscriptions to certain entity publications (i.e. weekly e-newsletters).

Figure 4:
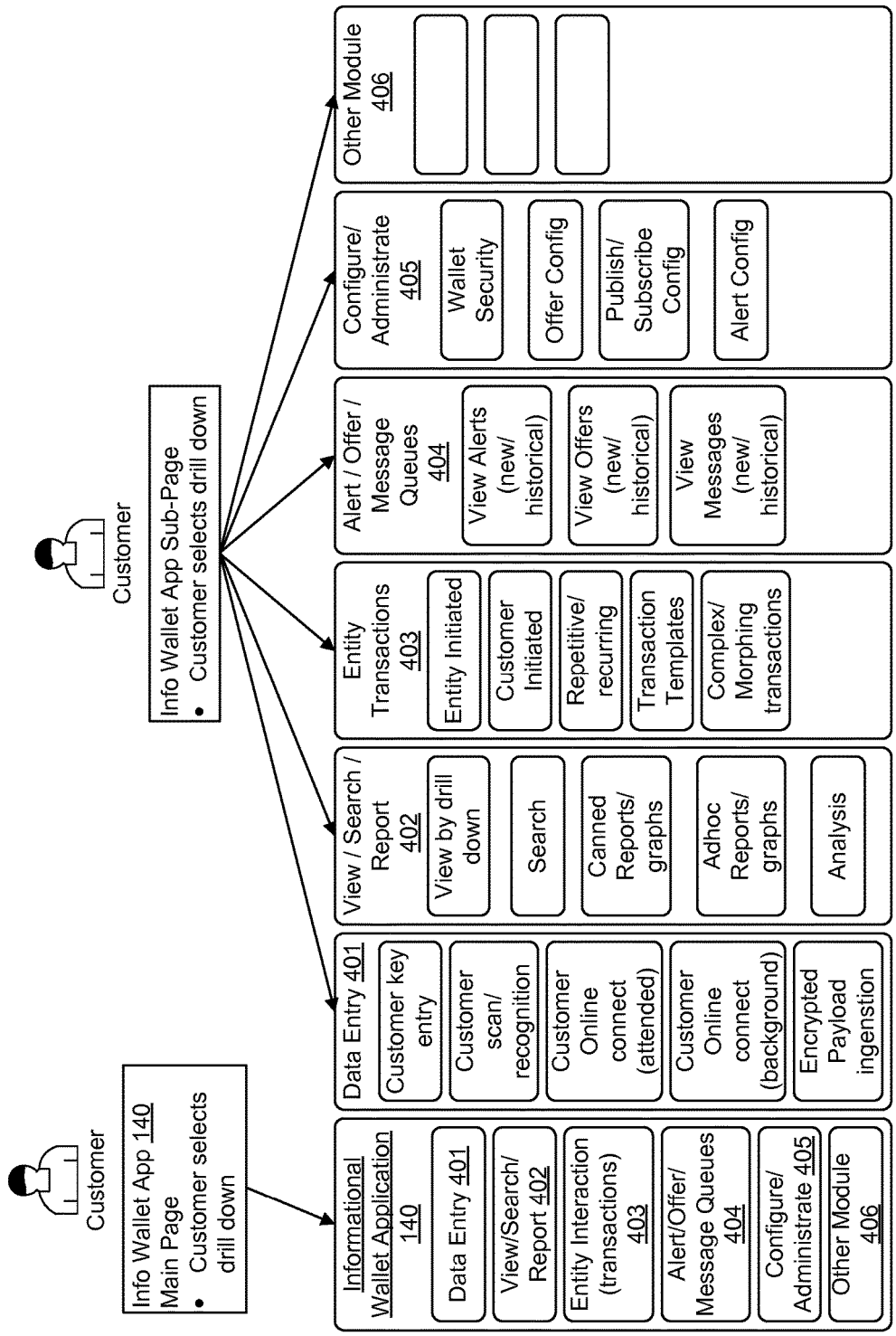
FIG. 4 is a schematic diagram of a computer-implemented information processing system from FIG. 1. according to an example embodiment.

FIG. 4 is a schematic diagram showing tools provided to the user via a user information wallet application 140 operating on the user computing device 120 according to an exemplary embodiment. The tools shown in FIG. 4 provide the user with different ways of entering, updating, accessing and analyzing their data stored in the cloud storage computing system 150. As shown in FIG. 4, by way of a top-level menu level of the information wallet application 140, the user may be provided with data entry tools 401, view/search/report tools 402, entity interaction tools 403, alert/offer/message queue tools 404, configure/administrate tools 405, and other module tools 406. As shown in FIG. 4, by selecting one of the top-level menu items, the user may be taken to a drill down menu that provides further options. In one embodiment, the data entry tools 401 allow a user to enter information into the information wallet system 100 through the user computing device 120. The data may be gathered by typing information into a screen or by capturing the information via other methods, including but not limited to capturing images, a vocal recording, a video recording, etc. The data entry tool 401 may have a drill down menu that provides more functions for the application. In one embodiment, the data entry tool 401 drill down menu includes modules such as customer key entry, customer scan/recognition, customer online connect (attended) customer online connect (background), and encrypted payload module. Customer key entry and scan/recognition modules support the data and information gathering functions discussed above. The customer online connect modules, both attended and background, facilitate the functions of gathering the data and information from the customer and transferring the data and information to the cloud storage computing system 150. The encrypted payload module serves to encrypt the data prior to transferring the data from the user computing device 120 to the cloud storage computing system 150 of the information wallet computing system 115. Any of the modules and functional units discussed above or below may contain logic executable by a processor to achieve the described functions.

The view/search/report tool 402 may allow the customer or user to view, search, and retrieve information from the information wallet application 140. For example, a customer may want to view specific information that the customer previously entered into the system through the data entry tool 401. To retrieve the information, the customer may use the view/search/report tool 402 module to enter certain parameters. The backend portion of the information wallet application 140 may retrieve the data from the cloud storage computing system 150 according to the parameters entered by the customer and deliver the information to the user computing device 120. In one embodiment, the view/search/report tool 402 drill down menu includes modules such as view by drill down, search, canned reports/graphs, adhoc reports/graphs, and analysis. These modules allow functions described above to occur, such as searching for information using certain parameters. The view by drill down menu may allow any information that the customer desires to view to be displayed in a list, which further displays related information upon engaging the list. The modules also allow the information to be presented in an organized, useful manner through avenues including graphs and reports. The information, data, reports, and graphs may be used for any type of analysis or metric functions. The analysis module may support functions such as retrieving a list of data, retrieving details behind the data, listing aspects of the data with accompanying relevant information, and so on. Analytics that may be performed may include numerical calculations, metric evaluation, a summary or analysis of numeric data (such analysis including mean, average, standard deviation, percentages, comparison, likelihood), cost projections, and so on. The user can also install applications (commonly called "apps") that specifically provide reporting and/or analysis to the user based on data in the informational wallet. For example, an application may correlate, driving habits, eating habits, and sleeping habits to health data (e.g., heart rate, blood pressure, oxygen saturation, etc.).

The entity transaction tool 403 allows the customer information wallet to interact with an entity through the information wallet system 100. In one embodiment, the entity transaction tool 403 drill down menu may include modules such as entity initiated, customer initiated, repetitive/recurring, transaction templates, and complex/morphing transactions. Through these modules, the customer may control how the customer interacts with the entity and how the entity is allowed to interact with the customer through the information wallet system 100. The entity initiated module allows a customer to control how entities initiate information requests or information transfers. The customer initiated module allows a customer to determine the manner in which it initiates transactions with an entity. For example, a customer may configure the information wallet application to solicit coupons for savings from specific entities. The repetitive/recurring module allows the customer to exact control on the interactions with the entities through the information wallet system 100 according to a specified period. For example, a customer may give recurring orders through the repetitive/recurring module (e.g. ordering medication every month). The transaction template module allows a customer to set a template on how information should be handled such that the transaction may easily occur in the future. Different entities may also have transaction templates, which could be transferred to the user computing device 120 and stored for easy use. The complex/morphing transactions facilitate transactions that are more complex than straight-forward transactions and change over time. These difficult transactions may involve greater manipulation and monitoring, and the complex/morphing transactions modules help facilitated those functions. The user may be able to write rules that govern these complex transactions. For example, the user may specify a rule that indicates that the user is to be prompted to order medication if blood pressure went over a certain threshold within the month.

In one embodiment, the alert/offer/message queues tool 404 includes a drill down menu with modules including view alerts, view offers, and view messages. These modules assists in displaying alerts from activities, offers from entities, or messages from any computing system connected with the information wallet system. The displays, offers, or messages may be new or historical. In one embodiment, the configure/administrate tool 405 contains a drill down menu with modules such as wallet security, offer configuration, publish/subscribe configuration, and alert configuration. The wallet security module controls the security of the wallet. A customer may engage this module to edit the security settings of the wallet and of information shared from the wallet. For example, the security level for certain information may be assigned using the wallet security module. The offer configuration module allows a customer to control which offers it receives from entities. This module supports the function of blocking or allowing offers received by the information wallet. The publish/subscribe configuration controls the manner in which information from the customer's information wallet account may be shared with other entity computing systems 105. Any of the modules discussed throughout the disclosure may communicate or interact with other modules in order to fulfill the required functions. For example, the publish/subscribe configuration module may interact with the wallet security module to determine what information to publish and to which entity. In one embodiment, the publish/subscribe configuration module determines the information's level of security as set in the wallet security module, then publishes the information according to the assigned security level. If information is set at a high level of security and requires a pin and thumbprint to publish, then the publish/subscribe configuration module will communicate with the wallet security module to enforce the pin and thumbprint requirement prior to publishing the information. The alert configuration modules allow a user to control when alerts will be given by the system. For example, a user may use the alert configuration module to set up an alert each time a user's social security number is solicited or shared. Other module tools 406 represent a plurality of modules that may facilitate the implementation of any desired function of the information wallet system.

FIG. 5 is a diagram showing information synchronization between various information wallet (IW) adapters 505 and user applications. Various adapters 505 may be developed to promote easy integration with business applications and systems, user devices, legacy systems, and so on. The adapters 505 may be used to enforce common data protocols and schemas. The adapters 505 may also be used to synchronize information traveling between, for example, entity computing systems 105 and the information wallet application 140 on a user computing device 120. As indicated in FIG. 5, different adapters 505 may be developed for different industries and tailored to meet specific industry needs. Adapters 505 may be developed for different software applications used by different types of businesses. Different data schemas may be developed for different domains (e.g., different industries). Again, the adapters within a common domain (e.g., healthcare) may use the same schemas to promote common data protocols and schemas. In various embodiments, the adapters may utilize both standard and non-standard schemas. For example, an entity may be permitted to add/change/delete any data element with the approval of the user. Those data elements can be "standard" within a domain or completely custom within a domain. In addition, an entity may be permitted to add a custom extension to an existing data element that is either standard or custom. In all cases the adds/changes/deletes may be versioned and saved so that the full data picture is preserved. In some situations, destructive deletes may be permitted with the approval/at the request of the user. Adapters 505 may also enforce security standards of the computing systems and information transferring between the computing systems of the information wallet system 100.

Figure 6:
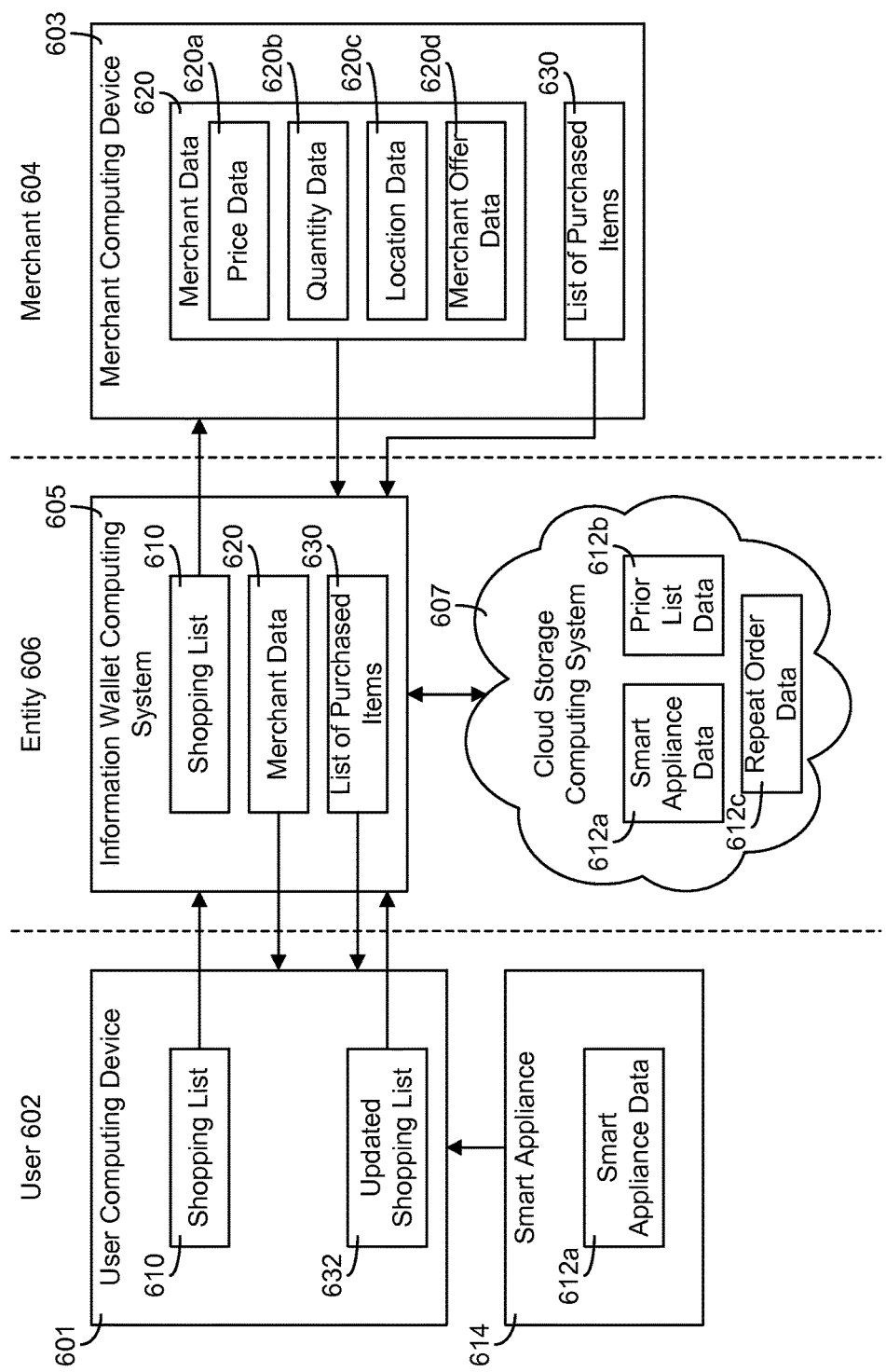
FIG. 6 is a data flow diagram of a process for managing a list in an information wallet system according to an exemplary embodiment.

FIG. 6 is a data flow diagram illustrating a process 600 for managing a shopping list in an information wallet system utilizing the systems from FIGS. 1-3 according to an exemplary embodiment. FIG. 6 generally illustrates an embodiment of process 600 wherein data is variously exchanged between a user computing device 601 of a user 602 and a merchant computing device 603 operated by a merchant 604. The exchange of data is facilitated by an information wallet computing system 605 which may reside within a computing system of an entity 606 such as a financial institution. For example, FIG. 6 shows information wallet computing system 605 disposed between merchant computing device 603 and user computing device 601 and is primarily described as residing within a financial institution computing system. As will be appreciated, however, information wallet computing system 605 may physically reside on and be executed by merchant computing device 603 and/or user computing device 601 and may comprise program logic executable by and between merchant computing device 603 and user computing device 601 to implement at least some of the functions described herein. As will be appreciated, the level of functionality of information wallet computing system 605 that resides on a computing system of entity 606 as opposed to merchant computing device 603 and/or user computing device 601 may vary depending on the implementation. Similarly, while a single user computing device 601, merchant computing device 603, and information wallet computing system 605 are shown in FIG. 6, process 600 may utilize multiple instances of these devices and systems as well. Information wallet computing system 605 may also host a cloud storage computing system 607.

Process 600 typically begins with user 602 using user computing device 601 to generate a shopping list 610, such as a grocery list. In order to generate shopping list 610, user 602 may provide shopping list data 612 representative of items to be added to shopping list 610 to user computing device 601 from one or more sources. For example, user 602 may manually enter shopping list data 612 using an input device of user computing device 601. In some embodiments, user 602 may receive shopping list data 612 from cloud storage computing system 607 via information wallet computing system 605. For example, user 602 may utilize a smart appliance or other device 614 (e.g., a refrigerator, storage container, cupboard, waste receptacle, product package, etc.) that regularly uploads shopping list data 612a to cloud storage computing system 607 via information wallet computing system 605. In some embodiments, smart appliance 614 may automatically send an alert to user computing device 601 either directly or via information wallet computing system 605 to inform user 602 that certain items represented by shopping list data 612a should be added to shopping list 610. For example, smart appliance 614 may recommend adding items to shopping list 610 based on the age of an item stored therein (e.g., expired milk), or the absence of a particular item (e.g., no remaining eggs, butter compartment empty, etc.). User 602 may also have stored data from prior shopping lists in cloud storage computing system 607 as shopping list data 612b. User 602 may also store shopping list data 612c for one or more repeat order items that are routinely included in shopping list 610. In some embodiments, user 602 may upload shopping list data 612a directly from smart appliance 614 or from other sources of shopping list data 612.

Upon receiving shopping list data 612 at user computing device 601, user 602 may further edit shopping list 610 by adding, changing or deleting items. For example, user 602 may upload shopping list data 612b from cloud storage computing system 607 via information wallet computing system 605. Shopping list data 612b may be a prior shopping list indicating that user 602 still needs to purchase a package of 8 AA batteries and a tube of toothpaste. User 602 may also upload shopping list data 612a directly from smart appliance 614 indicating that one dozen eggs and a gallon of milk should be added to shopping list 610. User 602 may review these items and determine that the package of 8 AA batteries is no longer necessary and manually remove it from shopping list 610. User 602 may then decide to manually add a bag of carrots to shopping list 610 as well, such that shopping list 610 includes eggs, milk, carrots, and toothpaste. User 602 may further decide to change, for example, the size or quantity of the items, or specify a particular brand of item.

User 602 may then send shopping list 610 from user computing device 601 to a merchant computing device 603 operated by merchant 604 via information wallet computing system 605. For example, user 602 may desire to receive pricing and quantity information from a preferred merchant 604 for items on shopping list 610 prior to making a trip to a physical location of merchant 604 so that user 602 can verify which items are available and the total cost. Merchant computing device 603 may respond by sending merchant data 620 in the form of price data 620a and quantity data 620b for items on shopping list 610 to user computing device 601 via information wallet computing system 605. For example, merchant computing device 603 may respond by sending price data 620a and quantity data 620b for carrots, milk and eggs listed in shopping list 610, and further indicate that toothpaste is currently out of stock. In some embodiments, user 602 may desire to perform comparative shopping by sending shopping list 610 to a plurality of merchants 604 connected to information wallet computing system 605. In such an embodiment, merchant computing devices 603 for each of the plurality of merchants 604 may respond by sending merchant data 620 for items on shopping list 610 to user computing device 601 via information wallet computing system 605.

Based in part on merchant data 620 received from one or more merchant computing devices 603, user 602 may select one or more merchants 604 from which to purchase items on shopping list 610. For example, user 602 may decide to purchase the carrots, milk and eggs listed in shopping list 610 from preferred merchant 604 and proceed to a physical location of preferred merchant 604. Similarly, user 602 may decide to purchase the toothpaste from a second merchant 604 after purchasing the carrots, milk and eggs listed in shopping list 610 from preferred merchant 604.

In order to assist user 602 in locating each of the items on shopping list 610, merchant computing device 603 may send merchant data 620 in the form of location data 620c to user computing device 601 via information wallet computing system 605. Location data 620c may be, for example, row, aisle, or shelf information for each of the items on shopping list 610. In some embodiments, merchant computing device 603 may send location data 620c in the form of, for example, map data or global positioning system (GPS) data providing directions to each of the items on shopping list 610. User 602 may then be guided through the rows and aisles of a physical location of merchant 604 using, for example, a mapping application on user computing device 601 in order to find the carrots, milk and eggs listed in shopping list 610.

Merchant computing device 603 may also send merchant data 620 to user computing device 601 in the form of one or more merchant offers 620d. In some embodiments, enterprise software on merchant computing device 603 may be operable to present user 602 with offers 620d for items on or similar to items on shopping list 610 via information wallet computing system 605 as user 602 is shopping. For example, merchant computing device 603 may send an offer 620d to user computing device 601 in the form of a two for one special on butter based on the presence of milk and eggs in shopping list 610.

Once user 602 has located one or more of the items on shopping list 610 and completed checkout, merchant computing device 603 may send a list of purchased items 630 to user computing device 601 via information wallet computing system 605. In some embodiments, list of purchased items 630 may be sent to user computing device 601 in the form of an itemized electronic receipt with price and quantity data for each item purchased. For example, assuming user 602 purchased the eggs and milk listed in shopping list 610, but not the carrots, a list of purchased items 630 may be sent to user computing device 601 in the form of an electronic receipt with price and quantity data for the eggs and milk purchased by user 602. In some embodiments, user computing device 601 may then reconcile list of purchased items 630 with shopping list 610 via information wallet computing system 605 in order to generate an updated shopping list to be stored in cloud storage computing system 607 as shopping list data 612b. For example, after reconciling list of purchased items 630 (including eggs and milk) with shopping list 610 (including eggs, milk, carrots and toothpaste), an updated shopping list including the carrots and toothpaste may be stored in cloud storage computing system 607 as shopping list data 612b.

In some embodiments, user 602 may procure items on shopping list 610 from more than one merchant 604. For example, user 602, having purchased the milk and eggs listed in shopping list 610 from preferred merchant 604, may then proceed to purchase the toothpaste from a second merchant 604. Once user 602 has located the toothpaste and completed checkout, merchant computing device 603 for second merchant 604 may send a second list of purchased items 630 to user computing device 601 via information wallet computing system 605. User computing device 601 may then reconcile the lists of purchased items 630 received from both merchants 604 with shopping list 610 via information wallet computing system 605 in order to generate an updated shopping list to be stored in cloud storage computing system 607 as shopping list data 612b. For example, after reconciling the first list of purchased items 630 from the preferred merchant 604 (including eggs and milk) and the second list of purchased items 630 from the second merchant (including toothpaste) with shopping list 610 (including eggs, milk, carrots and toothpaste), an updated shopping list including only the carrots may be stored in cloud storage computing system 607 as shopping list data 612b. The updated shopping list may then serve, for example, as the basis for another shopping list 610 at a later date, possibly in combination with updated shopping list data 612a from smart appliance 614 and/or repeat order data 612c.

Figure 7:
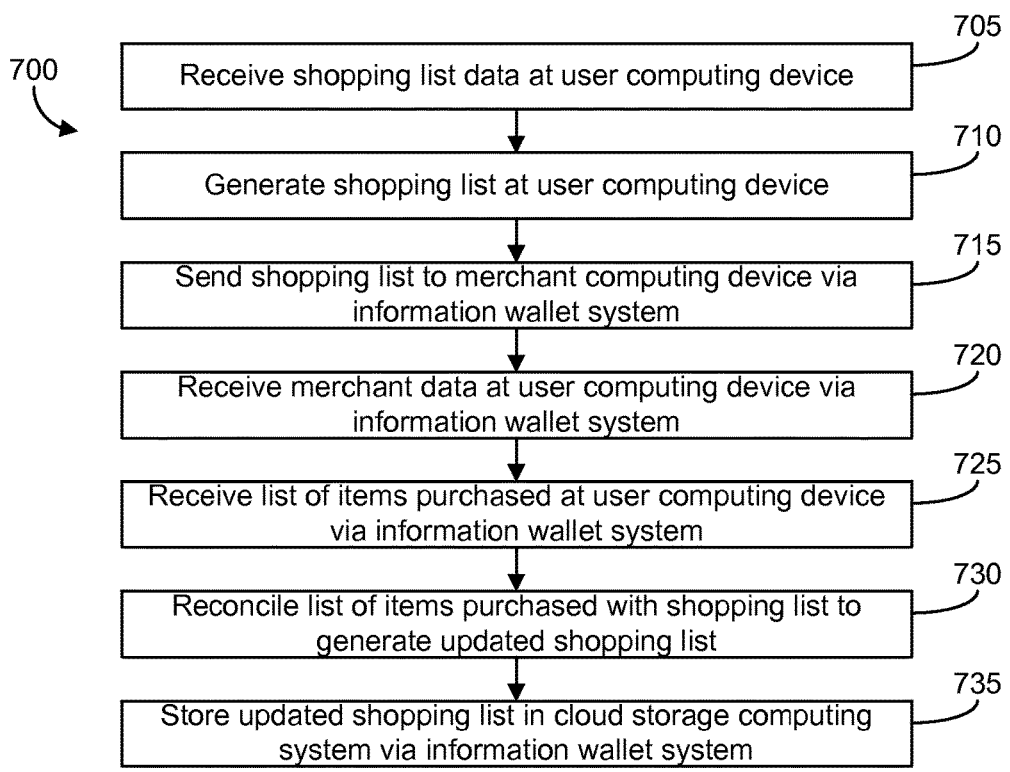
FIG. 7 is a flowchart of a process for managing a list in an information wallet system according to an exemplary embodiment.

FIG. 7 is a flowchart of a process 700 for managing a list in an information wallet system according to an exemplary embodiment. At a step 705, shopping list data may be received at a user computing device. The shopping list data may include items to be added to a shopping list. In some embodiments, receiving shopping list data may include receiving shopping list data from a smart appliance. In some embodiments, receiving shopping list data may include accessing a prior shopping list stored in a cloud storage computing system. In some embodiments, the shopping list data may include an alert from a smart appliance.

At a step 710, a shopping list is generated at the user computing device. The shopping list may include one or more of the items included in the shopping list data. In some embodiments, items in the shopping list data may be removed and additional items may be added. At a step 715, the shopping list may be sent to a merchant computing device via the information wallet system. In some embodiments, the shopping list may be sent to respective merchant computing devices for each of a plurality of merchants.

At a step 720, merchant data may be received at the user computing device from the merchant computing device via the information wallet system. The merchant data may include, for example, price data and quantity data for at least one item included in the shopping list. In some embodiments, receiving the merchant data may include receiving location data for the at least one item included in the shopping list. In some embodiments, receiving the location data may include receiving directions at the user computing device from the merchant computing device to guide a user through a store to locate the at least one item included in the shopping list. In some embodiments, receiving the merchant data may include receiving a merchant offer for the at least one item included in the shopping list. In some embodiments where the shopping list may be sent to respective merchant computing devices for each of a plurality of merchants, receiving the merchant data at the user computing device may include receiving merchant data from one or more of the plurality of merchant computing devices.

At a step 725, a list of items purchased may be received at the user computing device from the merchant computing device via the information wallet system. In some embodiments, the list of items purchased may be in the form of an itemized electronic receipt with price and quantity data for each item purchased. In some embodiments where the shopping list may be sent to respective merchant computing devices for each of a plurality of merchants, receiving the list of items purchased may include receiving a list of items purchased from one or more of the plurality of merchant computing devices.

At a step 730, the list of items purchased may be reconciled with the shopping list at the user computing device to generate an updated shopping list. In some embodiments where lists of items purchased are received from one or more of the plurality of merchant computing devices, each of the lists of items purchased may be reconciled with the shopping list to generate the updated shopping list. At a step 735, the updated shopping list may be stored in a cloud storage computing system via the information wallet system.

Figure 8:
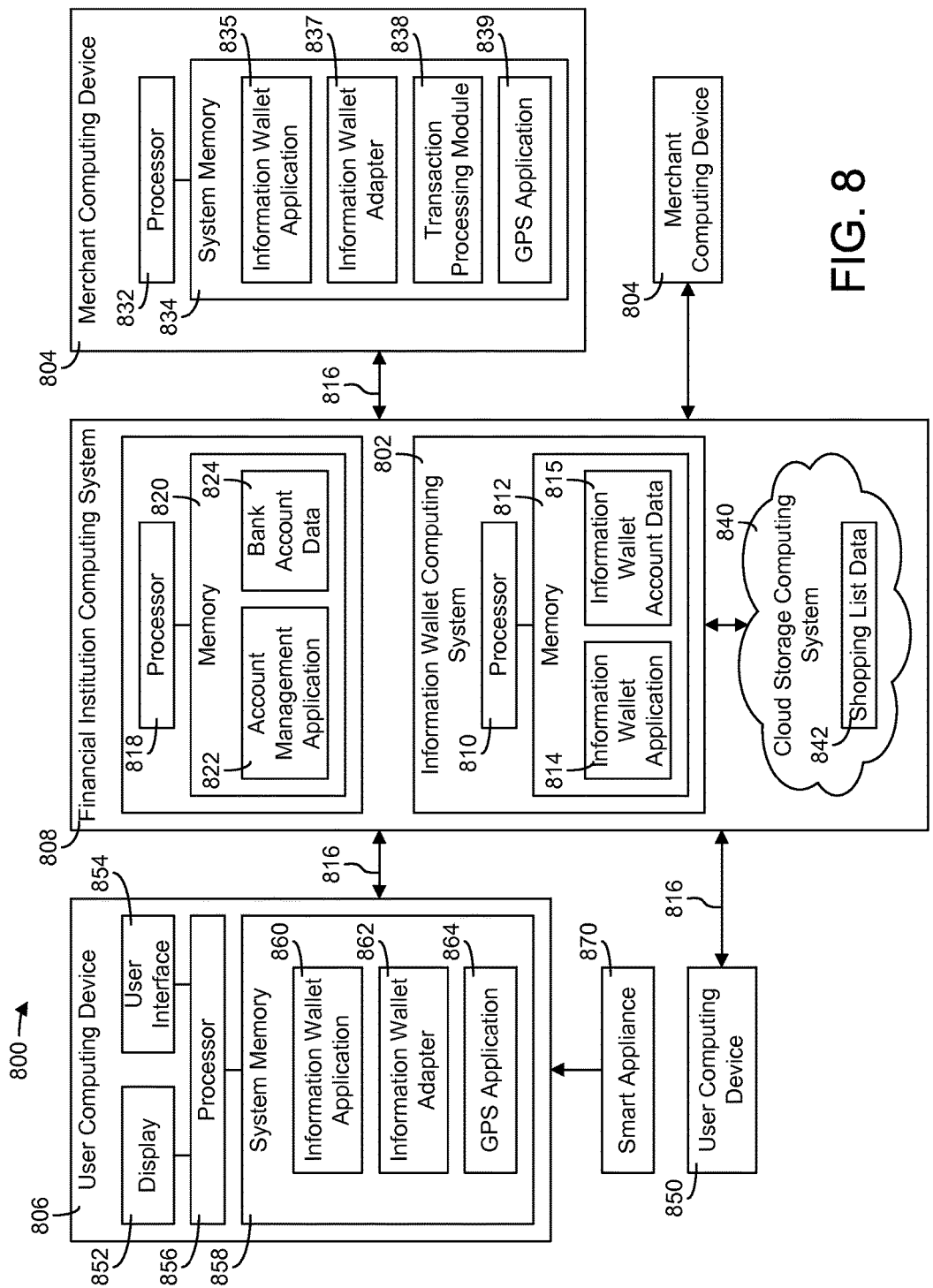
FIG. 8 is a block diagram of a system for managing a list in an information wallet system according to an exemplary embodiment.

FIG. 8 is a block diagram of a system 800 for managing a list in an information wallet system according to an exemplary embodiment. System 800 may include, for example, an information wallet computing system 802. System 802 may be implemented by, for example, general purpose or special purpose computers or other machines with a processor and memory configured to store applications including program code in the form of machine-executable instructions or data structures. In particular, system 802 may include one or more information wallet applications configured to implement one or more of the embodiments shown and described above with reference to FIGS. 1-7.

In some embodiments, system 802 may be implemented as a single unit. In other embodiments, system 800 may distribute functionality across multiple servers or other devices. For example, in the illustrated embodiment, information wallet computing system 802 is disposed between a merchant computing device 804 and a user computing device 806 and is further shown as residing within a financial institution computing system 808. As will be appreciated, however, information wallet computing system 802 may physically reside on and be executed by merchant computing device 804 and/or user computing device 806 and may comprise program logic executable by and between merchant computing device 804 and user computing device 806 to implement at least some of the functions described herein. As will be appreciated, the level of functionality of information wallet computing system 802 that resides on financial institution computing system 808 as opposed to merchant computing device 804 and/or user computing device 806 may vary depending on the implementation.

System 802 may include a processor 810. Processor 810 may be implemented in hardware, firmware, software, or any combination of these methods. System 802 may have one or more processors 810 that use the same or a different processing technology. Additionally, processor 810 may be a separate component or may be embedded within another component of system 802. Processor 810 may execute applications including program code in the form of machine-executable instructions that may be written using one or more programming languages, scripting languages, assembly languages, etc. The instructions may be carried out by, for example, a special purpose computer, logic circuits, or hardware circuits. Processor 810 may execute, for example, one or more information wallet applications configured to implement one or more of the embodiments shown and described above with reference to FIGS. 1-7.

System 802 may further include a system memory 812. System memory 812 may include, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired applications including program code in the form of machine-executable instructions or data structures and which may be accessed by a general purpose or special purpose computer or other machine. System 802 may have one or more system memories 812 that use the same or a different memory technology.

System memory 812 may store one or more information wallet applications configured to implement one or more of the embodiments shown and described above with reference to FIGS. 1-7. For example, system memory 812 may store an information wallet application 814 configured as described above with reference to FIGS. 1-7. Information wallet application 814 may be configured to generate a graphical user interface when executed by processor 810, such as one or more dynamically generated web pages presented to users of system 800 via browser or mobile applications operating on merchant computing device 804 and a user computing device 806. The graphical user interface may prompt the users to take certain actions and may receive user inputs provided in response to such prompting. System memory 812 may also store information wallet account data 815 configured as described above with reference to FIGS. 1-7 for one or more users of system 800.

System 802 may be accessed via, for example, a communication network 816. Communication network 816 may allow other devices to link to system 802 by, for example, a wired, wireless or combination local area network, wide area network (Internet), cellular network, NFC, Bluetooth connection, Wi-Fi, Wi-Max, a proprietary banking network, etc. Communication network 816 may include any necessary hardware and/or software to facilitate secure transmission of data.

System 802 may reside on financial institution computing system 808. Financial institution computing system 808 may include a processor 818 similar to processor 810 and a system memory 820 similar to system memory 812. System memory 820 may store one or more applications, such as account management application 822, as well as bank account data for one or more users of system 800.

System 802 may be accessed by one or more merchants using one or more merchant computing devices 830. Merchant computing device 830 may include a processor 832 similar to processor 810 and a system memory 834 similar to system memory 812. System memory 834 may store an information wallet application 835 and an information wallet adapter 837 configured as described above with reference to FIGS. 1-7. System memory 834 may further store a transaction processing module 838 configured to process merchant sales transaction data and to provide price data, quantity data, merchant offer data and electronic receipt data as described above with reference to FIGS. 6-7. System memory 834 may further store a GPS application 839 configured to provide location data as described above with reference to FIGS. 6-7.

System 802 may be in communication with a cloud storage computing system 840 configured as described above with reference to FIGS. 1-7. In particular, cloud storage computing system 840 may store shopping list data 842 as described above with reference to FIGS. 6-7.

System 802 may also be accessed by one or more user computing devices 850. User computing device 850 may be, for example, a laptop, home computer, mobile phone, tablet, or any other computing devices. User computing device 850 may include a display 852, a user interface 854, a processor 856, a system memory 858, and a system bus that couples various system components including system memory 858 to processor 856. In particular, user computing device 850 may be configured to implement one or more of the embodiments of user computing devices 806 shown and described above with reference to FIGS. 1-7.

Display 852 may be, for example, an LED or LCD display which may also include a touch screen. User interface 854 may include, for example, a keyboard, a keypad, a mouse, joystick or other input device performing a similar function. Processor 866 may be implemented in hardware, firmware, software, or any combination of these methods. User computing device 850 may have one or more processors 856 that use the same or a different processing technology. Additionally, processor 856 may be a separate component of mobile device 850, or may be embedded within another component of mobile device 850. Processor 856 may execute applications including program code in the form of machine-executable instructions that may be written using one or more programming languages, scripting languages, assembly languages, etc. The instructions may be carried out by, for example, a special purpose computer, logic circuits, or hardware circuits. Processor 856 may execute, for example, email, browser or other applications stored in memory 858. The email, browser or other applications stored in memory 858 may be any type of software that is capable of communicating with system 602 via a network connection. System memory 858 may store an information wallet application 860 and an information wallet adapter 862 configured as described above with reference to FIGS. 1-7. System memory 834 may further store a GPS application 864 configured to process location data as described above with reference to FIGS. 6-7.

User computing device 850 may communicate with system 802 via communication network 816 through, for example, a wired, wireless or combination local area network, wide area network (Internet), cellular network, NFC, Bluetooth connection, Wi-Fi, Wi-Max, a proprietary banking network, etc. Programs may run on respective computers to create a client-server relationship. For example, in some embodiments, user computing device 850 may execute a web browser or other application to interact with system 802, and data may be provided to a user interface of the web browser or other application executing on user computing device 850. For example, system 802 may provide content to the web browser or other application of user computing device 850 in response to a request received from user computing device 850.

User computing device 850 may also communicate with one or more smart appliances 870. Smart appliance 870 may be, for example, a refrigerator programmed to determine the types and quantities of products stored inside it and to keep track of such information through, for example, barcode or RFID scanning Smart appliance 870 may be configured to communicate with user computing device 850 via, for example, a wireless connection such as a Bluetooth, Wi-Fi, WAN, 3G, 4G, NFC or other connection.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on.

Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

What is claimed is:

1. An information wallet computing system, comprising:
a processor;
a first information wallet adapter provided to a user computing device;
a second information wallet adapter provided to a first merchant computing device, the second information wallet adapter configured to provide access to a first data stored on machine readable storage media coupled to the processor and configured to enforce a first security standard of the first merchant computing device;
a third information wallet adapter provided to a second merchant computing device, the third information wallet adapter configured to provide access to the first data and configured to enforce a second security standard of the second merchant computing device;
an information wallet application stored on the machine readable storage media coupled to the processor and including program logic that, when executed by the processor, causes the processor to synchronize the first data between the user computing device, the first merchant computing device, and the second merchant computing device by causing the processor to:
receive the first data from the first information wallet adapter stored on the user computing device;
determine a security level assigned to the first data allows access to the first data by the second information wallet adapter provided to the first merchant computing device and the third information wallet adapter provided to the second merchant computing device;
send the first data automatically using the first security standard consequent to receiving the first data and consequent to the second wallet adapter configured to provide access to the first data to the second information wallet adapter stored on the first merchant computing device;
send the first data automatically using the second security standard consequent to receiving the first data and consequent to the third wallet adapter configured to provide access to the first data to the third information wallet adapter stored on the second merchant computing device;
receive merchant data from the second information wallet adapter and the third information wallet adapter, wherein the merchant data includes one of price data and quantity data associated with the first data; and
send the merchant data to the first information wallet adapter to generate an updated first data.

2. The system of claim 1, wherein the first, second, and third information wallet adapters are configured to enforce a common data protocol and to synchronize information traveling among the user computing device and the merchant computing devices to a cloud storage computing system, wherein the cloud storage computing system is accessible by the information wallet storage application and configured to communicate with the first and second information wallet adapters.

3. The system of claim 1, wherein the information wallet computing system resides in a financial institution computing system, and further comprising account management logic stored on the machine readable storage media and configured to manage accounts respectively associated with a plurality of users, the accounts including bank accounts and information wallet accounts.

4. The system of claim 1, wherein the first data is shopping list data and includes data received from a smart appliance.

5. The system of claim 1, wherein the merchant data further includes location data for the at least one item included in a shopping list included in the first data such that, when received by the first information wallet adapter, a user of the user computing device is guided to the location of the at least one item included in the shopping list via the location data.

6. The system of claim 1, wherein the merchant data further includes a merchant offer for the at least one item included in a shopping list included in the first data.

7. The system of claim 1, wherein the program logic is further configured to receive a selection of a merchant associated with one of the first merchant computing device and the second merchant computing device by a user of the user computing device.

8. A method of using an information wallet system to manage synchronization of a first data between a user computing device, a first merchant computing device, and a second merchant computing device, comprising:
 receiving the first data by a processor of the user computing device, wherein the first data includes items to be added to a shopping list, and wherein the user computing device provided a first information wallet adapter;
 generating the shopping list at the user computing device, wherein the shopping list includes one or more of the items included in the first data;
 determining a security level assigned to the first data is sufficient to allow access to the first data by a second information wallet adapter provided to the first merchant computing device and a third information wallet adapter provided to the second merchant computing device;
 sending the first data automatically to the second information wallet adapter provided to the first merchant computing device via the information wallet system using the first information wallet adapter using the first security standard consequent to receiving the first data by the processor of the user computing device and consequent to configuring the second wallet adapter to provide access to the first data, the second information wallet adapter configured to provide access to the first data and enforce a first security standard of the first merchant computing device;
 sending the first data automatically to the third information wallet adapter provided to the second merchant computing device via the information wallet system using the first information wallet adapter using the second security standard consequent to receiving the first data by the processor of the user computing device and consequent to configuring the third wallet adapter to provide access to the first data, the third information wallet adapter configured to provide access to the first data and enforce a second security standard of the second merchant computing device;
 receiving merchant data at the user computing device from the first merchant computing device and the second merchant computing device via the information wallet system, wherein the merchant data includes one of price data and quantity data for at least one item included in the shopping list;
 receiving, at the user computing device, second data comprising an item purchased from one of the first merchant computing device and the second merchant computing device via the information wallet system; and
 reconciling the item purchased with the shopping list at the user computing device to generate an updated shopping list.

9. The method of claim 8, wherein receiving the first data at the user computing device includes receiving shopping list data from a smart appliance.

10. The method of claim 9, wherein receiving shopping list data at the user computing device includes receiving an alert from the smart appliance.

11. The method of claim 8, wherein receiving the first data at the user computing device includes accessing a prior shopping list stored in a cloud storage computing system via the information wallet system.

12. The method of claim 11, wherein a selection of a merchant associated with one of the first merchant computing device and the second merchant computing device by a user of the user computing device.

13. The method of claim 8, wherein the merchant data further includes location data for the at least one item included in the shopping list.

14. The method of claim 13, further comprising receiving directions at the user computing device to guide a user through a store to locate the at least one item included in the shopping list.

15. The method of claim 8 wherein the merchant data further includes a merchant offer for the at least one item included in the shopping list.

16. The method of claim 8, further comprising storing the updated shopping list in a cloud storage computing system via the information wallet system.

17. A method of using an information wallet system to manage a shopping list by synchronization of a first data between a user computing device, a first merchant computing device, and a second merchant computing device, comprising:
 providing a first information wallet adapter to the user computing device;
 configuring a second information wallet adapter to provide access to the first data and enforce a first security standard of the first merchant computing device;
 configuring a third information wallet adapter to provide access to the first data and enforce a second security standard of the second merchant computing device;
 providing the second information wallet adapter to the first merchant computing device;
 providing the third information wallet adapter to the second merchant computing device;
 receiving the first data from the first information wallet adapter provided to the user computing device at the second information wallet adapter provided to the first merchant computing device via the information wallet system using the first security standard consequent to configuring the second wallet adapter to provide access to the first data, upon a determination a security level assigned to the first data is sufficient to allow access to the first data by the first merchant computing device;
 receiving the first data from the first information wallet adapter stored on the user computing device at the third information wallet adapter provided to the second merchant computing device via the information wallet system using the second security standard consequent to configuring the third wallet adapter to provide access to the first data, upon a determination a security level assigned to the first data is sufficient to allow access to the first data by the second merchant computing device;

sending merchant data from the second information wallet adapter and the third information wallet adapter to the user computing device, wherein the merchant data includes one of price data and quantity data associated with the first data; and guiding a user of the user computing device to the location of at least one item included in the first data via location data sent to the user computing device.

18. The method of claim 17, further comprising sending second data comprising an item purchased from at least one of the first merchant computing device and the second merchant computing device to the user computing device, wherein the item purchased is an item included in the first data.

19. The method of claim 18, wherein the second data is configured for electronic reconciliation with the first data in order to generate an updated first data.

20. The method of claim 17, wherein receiving the first data from the user computing device at the merchant computing device via the information wallet system includes receiving the first data via an information wallet computing system hosted by a financial institution.

21. The method of claim 17, wherein the merchant data further includes a merchant offer for the at least one item included in the first data.

* * * * *